(12) United States Patent
Bowlds

(10) Patent No.: US 6,462,702 B1
(45) Date of Patent: Oct. 8, 2002

(54) DOPPLER-BASED TRAFFIC RADAR SYSTEM

(75) Inventor: Harvey F. Bowlds, Owensboro, KY (US)

(73) Assignee: MPH Industries, Inc., Owensboro, KY (US)

( * ) Notice: Subject to any disclaimer, the term of this patent is extended or adjusted under 35 U.S.C. 154(b) by 0 days.

(21) Appl. No.: 09/988,900

(22) Filed: Nov. 19, 2001

Related U.S. Application Data

(63) Continuation-in-part of application No. 09/845,706, filed on Apr. 30, 2001, now Pat. No. 6,417,796, which is a continuation-in-part of application No. 09/432,341, filed on Nov. 2, 1999, now abandoned, which is a continuation-in-part of application No. 09/154,314, filed on Sep. 16, 1998, now Pat. No. 6,008,752.

(51) Int. Cl.$^7$ ............................................. G01S 13/58
(52) U.S. Cl. ...................... 342/104; 342/114; 342/115; 342/116
(58) Field of Search ................................. 342/104, 111, 342/114, 115, 116

(56) References Cited

U.S. PATENT DOCUMENTS 6,008,752 A * 12/1999 Husk et al. .................. 342/104
6,417,796 B1 * 7/2002 Bowlds ....................... 342/104

* cited by examiner

Primary Examiner—John B. Sotomayor
(74) Attorney, Agent, or Firm—King & Schickli, PLLC

(57) ABSTRACT

A Doppler-based radar system and related method are provided for determining the direction and speed of at least one selected target traveling in the same lane as a moving patrol vehicle supporting the radar system independent of the direction of the target relative to the platform. The radar system includes an oscillator to generate a signal, an antenna to transmit the signal toward the at least one target and to receive a return signal reflected from the at least one target, a turnstile in communication with the antenna for receiving the return signal and forming processing signals which are different in phase, and circuitry for determining the direction of the at least one target relative to the platform and the speed of the at least one target dependent upon a mode of operation of the radar system.

21 Claims, 6 Drawing Sheets

DOPPLER-BASED TRAFFIC RADAR SYSTEM

This is a continuation application of continuation-in-part application U.S. patent application Ser. No. 09/845,706, filed Apr. 30, 2001, now U.S. Pat. No. 6,417,796 entitled "Doppler-based Traffic Radar System" which is a continuation-in-part application of U.S. patent application Ser. No. 09/432,341, filed Nov. 2, 1999, entitled "Doppler-based Traffic Radar System" now abandoned, which is a continuation-in-part of U.S. patent application Ser. No. 09/154,314, now U.S. Pat. No. 6,008,752, filed Sep. 16, 1998, entitled "Doppler-based Traffic Radar System."

TECHNICAL FIELD

The present invention relates generally to a Doppler-based traffic radar system and, more particularly to a radar system and related method for determining the speed of target vehicles independent of the direction of the target vehicles relative to a patrol vehicle supporting the radar system.

BACKGROUND OF THE INVENTION

Law enforcement officers have utilized Doppler-based traffic radar systems to monitor vehicle speeds and enforce traffic speed limit laws for many years. Throughout this period of time, numerous improvements in both the underlying technology and in the specific application of new processing techniques for the traffic radar systems themselves, have afforded law enforcement officers greater flexibility and improved reliability in carrying out their duties. One such improvement evident in most traffic radar systems presently being marketed includes the capability to more accurately and reliably monitor the speed of certain vehicles while the patrol vehicle is either in a stationary or a moving mode of operation. In fact, the most recent traffic radar systems can now successfully monitor the speed of vehicles approaching the moving patrol vehicle in an opposite lane.

In addition to these capabilities, such radar systems also provide the law enforcement officer the capability to monitor a group of target vehicles simultaneously and to determine the fastest vehicle within the group and/or the vehicle presenting the traditional strongest reflected return signal. Importantly, each of these new or improved capabilities provide the law enforcement officer with a more complete picture of the traffic environment and thus, a more flexible and reliable basis for making more informed decisions.

Despite all the improvements in both the underlying technology utilized in these traffic radar systems and the radar systems themselves, however, a broadly recognized shortcoming of these systems involves the successful monitoring of the speed of vehicles approaching or receding away from the patrol vehicle in the same-lane moving mode without operator intervention. In practice, even the most recent traffic radar systems require the law enforcement officer to make an initial discretionary decision regarding the relative movement of a target vehicle operating in the same lane as the patrol vehicle.

In other words, the law enforcement officer must visually observe the target vehicle in front of or behind the patrol vehicle and decide whether the vehicle is approaching or receding relative to the patrol vehicle. Of course, these manual operations are conducted while also maintaining operation of the patrol vehicle. Additionally, the officer must continually update this information by manually inputting it into the radar system. Typically, a two-position manual switch located adjacent a display or a handheld remote control device of the radar system is utilized to dictate the approaching/receding status of the target vehicle and to indicate the requisite method of calculation to be utilized by the radar system in determining the speed of the target vehicle. These discretionary decisions and required manual operations contribute to the curtailment of the overall flexibility and reliability afforded law enforcement officers by both conventional and digital signal processing (DSP) capable radar systems.

Thus, while conventional and DSP traffic radar systems are both capable of a high degree of accuracy with regard to vehicle speed measurements, great care must be exercised in the use of such systems in properly and accurately attributing a speed to a particular target vehicle. This is of increased importance when monitoring the speed of vehicles approaching or receding away from the patrol vehicle in the same-lane when the law enforcement officer must initially visually observe and determine the direction of the target vehicle relative to the patrol vehicle.

Yet another broadly recognized shortcoming of these traffic radar systems includes the inability to accurately monitor the speeds of vehicles approaching or receding away from the patrol vehicle in the stationary mode of operation. Typically to overcome this shortcoming, the patrol vehicle must position itself between the driving lanes; for example, within the median area along interstates or other divided highways. This effectively eliminates the unwanted approaching or receding targets from the beam of the radar system, thus improving the accuracy and reliability afforded the law enforcement officer. The requirement that the patrol vehicle be located in a particular manner, however, severely limits the overall effectiveness of the radar system.

One alternative to establishing a monitoring position within the median of divided roadways presently available to law enforcement officers is to position the patrol vehicle on the shoulder of the roadway parallel to the highway. This alternative is satisfactory in some settings, particularly along isolated, low volume highways but is of only limited value along the busier and more frequently patrolled highways, such as main traffic arteries. When monitoring vehicle speeds along these highways, the law enforcement officer is forced to wait for openings or gaps in the traffic pattern before utilizing the radar system to determine the speed of approaching/receding opposing lane vehicles. This is due to the potential interference in the radar system processing created by intervening vehicles traveling in the same lane in which the patrol vehicle is positioned.

Accordingly, a need is clearly identified for a radar system and related methods capable of determining the actual speed of selected target vehicles traveling in the same lane as the moving patrol vehicle, or in a different lane than the stationary patrol vehicle. Such a radar system and related methods would effectively remove the reliance on discretionary decisions made by law enforcement officers in determining the relative direction of target vehicles operating in the same lane as the patrol vehicle, and would further increase the overall flexibility and reliability afforded the system operator, particularly in monitoring traffic across busy divided highways.

SUMMARY OF THE INVENTION

A Doppler-based traffic radar system is provided that increases the overall flexibility and reliability afforded the system operator, and most importantly eliminates the reliance on discretionary decision making. More specifically, the radar system of the present invention is adapted to determine the speed of at least one moving target traveling in generally the same direction as a platform supporting the radar system independent of the direction of the at least one target relative to the platform. This allows the speed of target vehicles traveling in the same lane and in the same direction as the patrol vehicle to be monitored without manual intervention by the operator. The radar system is further adapted in a stationary mode of operation to determine the speed of a selected moving target independent of the location of the patrol vehicle. This is accomplished in part by selectively eliminating all unwanted approaching or receding targets depending upon the present traffic/patrol scenario.

The radar system of the present invention splits the return signals reflected from the at least one moving target in order to form a test processing signal and a reference processing signal. More specifically, the return signals received from an antenna are split in a turnstile, thus generating first and second split signals. The split signals are substantially equivalent both containing information about the at least one target. A mixer within the turnstile mixes the first split signal with a first portion of the transmitted signal to form a test processing signal. Likewise, the second split signal is mixed with a second portion of the transmitted signal to form a reference processing signal.

Any suitable means may be used to insure that the first and second portions of the transmitted signal, and thus the resultant processing signals, are different in phase. For example, use of microstrip transmission lines of differing lengths connecting each of a pair of sniffer probes for coupling portions of the transmitted signal and mixers is sufficient to cause the signals to be different in phase. Alternatively, a phase shifter or other means known in the art may be utilized.

Because the resulting processing signals are equal in magnitude, but different in phase, the direction of the at least one target relative to the platform can be determined and the speed accurately calculated. For instance, if the phase of the reference signal for an approaching target leads the phase of the test signal, then the phase of the reference signal for a receding target will lag the phase of the test signal. This phase differential in the processing signals also allows the radar system to more accurately calculate the speed of a selected target in the stationary mode of operation.

In accordance with an important aspect of the present invention, speed determining circuitry includes a first means for transforming the processing signals from the time domain to the frequency domain to provide a frequency spectrum, a second means for selectively filtering the processing signals to allow only a range of frequencies substantially centered about the frequency of the selected moving target to pass, and a third means for selectively shifting the phase of one of the processing signals.

As is well known in the art, the resulting frequency spectrum of a time to frequency domain transformation necessarily includes a plurality of bins indicative of the Doppler components of the at least one target. More specifically, the Doppler components include the amplitude and frequency of each target. During operation, the radar system searches the Doppler components and selects a target according to the present operating mode of the radar system. For example, in a strongest target mode of operation, the Doppler components may be searched and a target having the highest amplitude selected. Similarly, in a fastest target mode of operation, the Doppler components may be searched and a target having the highest frequency selected.

Once the step of selecting a target in the moving mode of operation is accomplished, and irrespective of the fastest/strongest mode of operation of the radar system, a second means of the speed determining circuitry may selectively filter the processing signals to allow only a range of frequencies substantially centered about the frequency of the selected moving target to pass. In accordance with one method of the present invention, each of the processing signals are passed through a selected band pass filter to filter unwanted noise and any additional unselected targets including the patrol vehicle signal. The resulting filtered processing signals are further utilized to determine the direction of the selected moving target relative to the platform. Based on the determined direction of the selected moving target, the speed of the target is calculated and displayed by the radar system for the operator's use.

In addition, a third means of the speed determining circuitry is provided for selectively shifting the phase of one of the processing signals dependent upon a mode of operation of the radar system. Specifically, shifting the phase of one of the processing signals eliminates either all approaching or receding vehicles from further speed calculations when the radar system is in the stationary mode of operation. This allows the law enforcement officer to position the patrol vehicle at any convenient location, for example, along the shoulder of a roadway even if the roadway is a divided highway.

In accordance with another embodiment of the present invention and related method, the direction of the at least one target relative to the platform is determined by cross-correlating the components for each of the bins in the frequency spectrums. Preferably, the processing signals are each transformed into the frequency domain to provide the frequency spectrums as described above. The resulting Doppler components of the at least one frequency spectrums are subsequently cross-correlated by the speed determining circuitry to obtain a cross correlation spectrum of real and imaginary cross-correlated components. In accordance with an important aspect of the present invention, the resulting components of the cross-correlation are indicative of the direction and speed of the at least one target.

During operation, the radar system selects a target from the cross-correlation components according to the present operating mode of the radar system. In a moving, strongest target mode of operation, for example, the cross-correlation components may be searched for a target having the highest amplitude. Similarly, in a moving, fastest target mode of operation, the cross-correlation components may be searched for a target having the highest frequency. Additional modes of operation of radar systems are generally well known in the art and may require the radar system to determine the speed of a target in a stationary, strongest mode; a stationary, fastest mode; a stationary, strongest and fastest mode; a moving, strongest, opposite lane mode; a moving, strongest, same lane mode; a moving, fastest, opposite lane mode; a moving, fastest and strongest, opposite lane mode; a moving, fastest, same lane mode; a moving, fastest, same lane mode; or a moving fastest and strongest same lane mode.

Importantly, the step of selecting at least one target may be made after the direction of the at least one target is determined. Once the step of selecting a target is accomplished, the speed of the at least one target may be calculated dependent upon a determined direction of the target and displayed by the radar system for the operator's use. Advantageously, this allows for the speed of multiple targets to be determined and displayed.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings.

Reference will now be made in detail to the present preferred embodiment of the invention, an example of which is illustrated in the accompanying drawings.

DETAILED DESCRIPTION OF THE PREFERRED EMBODIMENT

Figure 1:
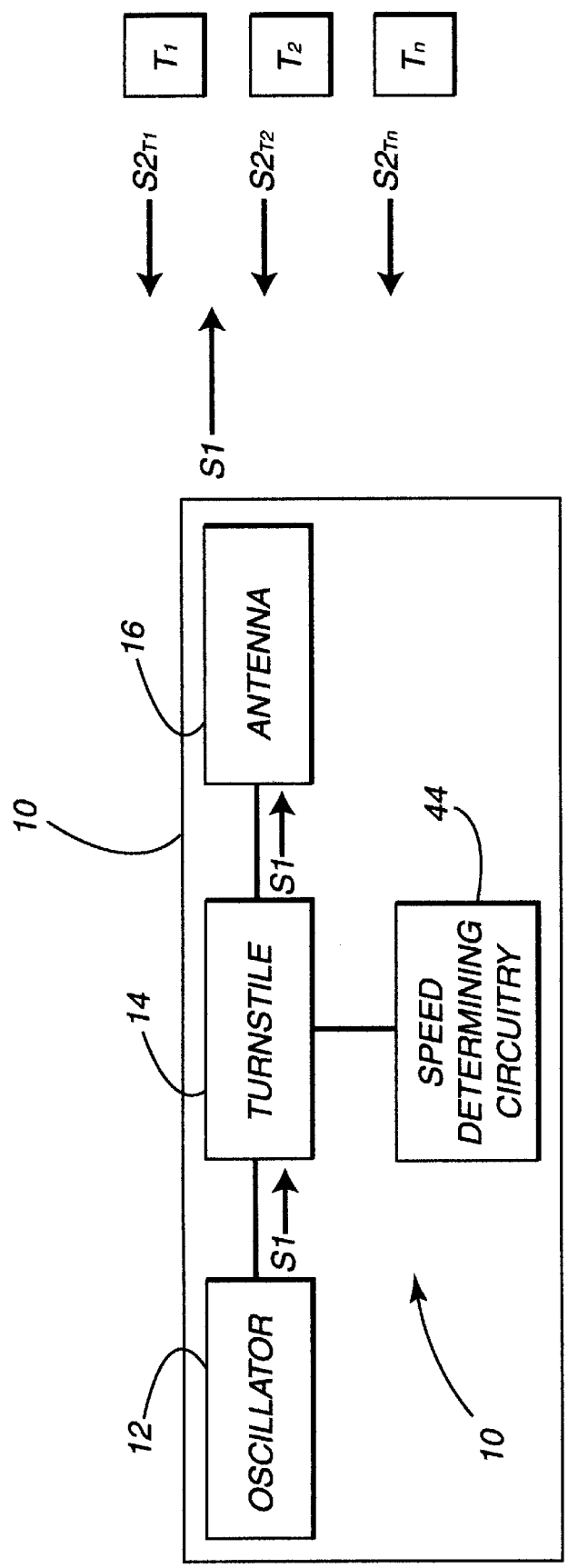
FIG. 1 is an overall schematic block diagram of the Doppler-based radar system of the present invention.

With reference now to the schematic block diagram of FIG. 1, there is shown a preferred embodiment of a Doppler-based radar system 10 for use in monitoring the speed of moving targets. More specifically, the radar system 10 of the present invention is adapted to determine the speed of a selected moving target traveling in generally the same direction as a moving platform supporting the radar system independent of the direction of the target relative to the platform. This allows the speed of target vehicles traveling in the same lane and in the same direction as the patrol vehicle to be monitored without manual intervention by the operator. The radar system 10 is further adapted in a stationary mode of operation to determine the speed of a selected moving target independent of the location of the patrol vehicle.

The radar system 10 includes a conventional Gunn diode oscillator to generate a constant wave radar signal S1. The radar or oscillator signal S1 is passed through a turnstile 14 to an antenna 16. In the preferred embodiment, the antenna is a circularly polarized horn antenna having a half-power beam width of thirteen (13) degrees in azimuth and elevation. The antenna 16 forms a transmitter to transmit the radar signal S1 toward at least one target $T_1, T_2 \ldots T_n$ and a receiver to receive the reflective return signals $S2_{T1}$, $S2_{T2} \ldots S2_{Tn}$, respectively. The return signal $S2_{T1}$ is indicative, for example, of the speed of target $T_1$.

In accordance with well known Doppler principles, if the target $T_1$, for example, is moving toward or away from the antenna, the frequency (fr) of the transmitted signal S1 is shifted (fr±d) upon contacting the target $T_1$, thus forming the reflected radar signal $S2_{T1}$ in accordance with the speed of the target.

Figure 2:
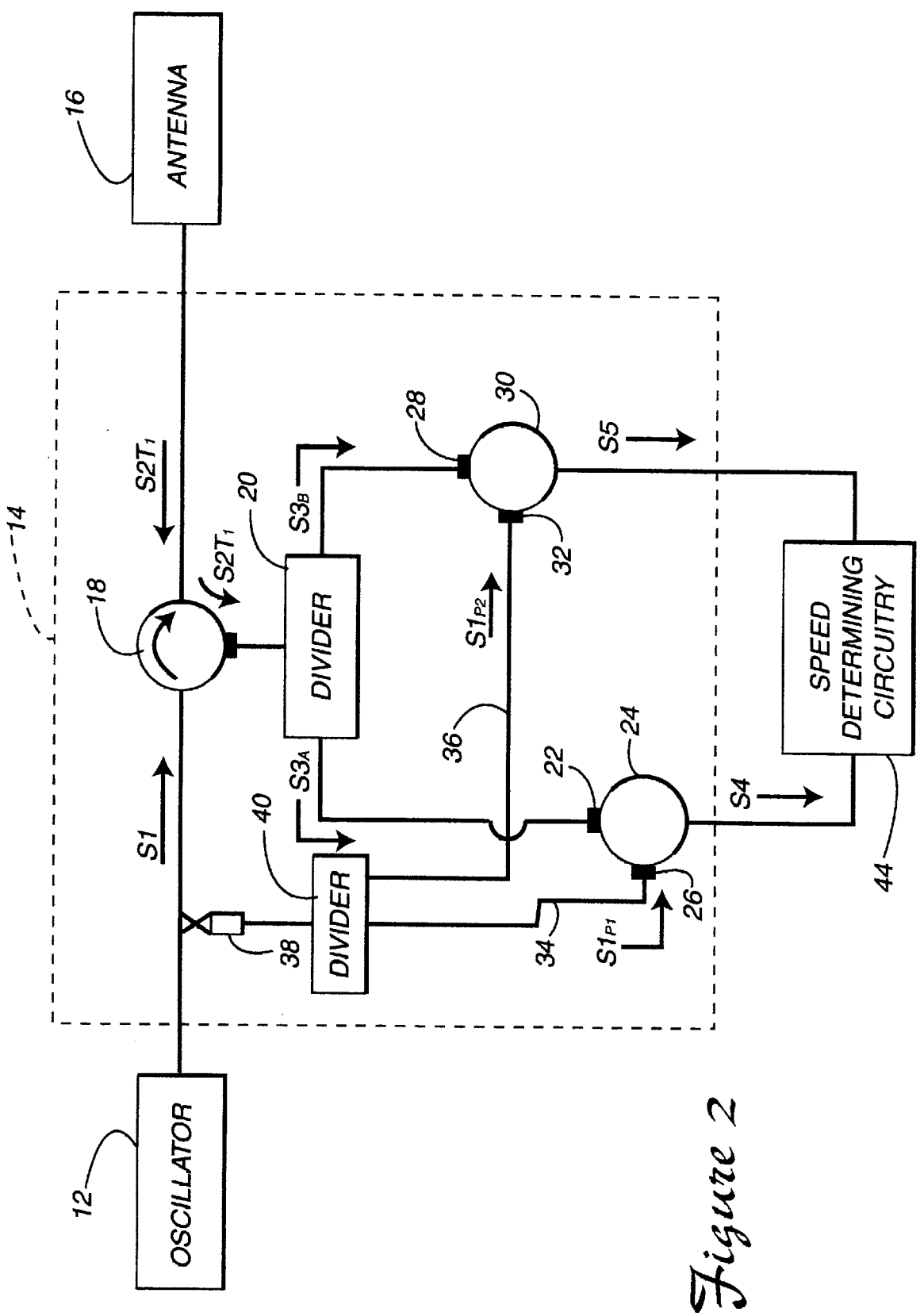
FIG. 2 is a detailed schematic block diagram of the turnstile of the present invention.

As shown in FIG. 2, the reflected return signals $S2_{T1} \ldots S2_{Tn}$ are received by the antenna 16 and forwarded to a duplexer 18 within the turnstile 14. In use, the duplexer 18 isolates each return signal, for example $S2_{T1}$, from the transmitted signal S1, converting the circularly polarized signals to linearly polarized signals. In the preferred embodiment, a splitter or divider 20 in the form of a Wilkinson divider or wave guide tee within the turnstile 14 substantially splits the return signal $S2_{T1}$, thus generating first and second split signals $S3_A$, $S3_B$. The split signals $S3_A$, $S3_B$ are equivalent in phase and amplitude.

Also within the turnstile 14, the first split signal $S3_A$ is forwarded to a first receive port 22 of a mixer 24, or mixer diode, where the signal $S3_A$ is combined with a first coupled portion of the transmitted signal $S1_{P1}$ or leakage signal forwarded to a second receive port 26 of the mixer 24. The mixer 24 combines the signals to form a test processing signal S4. Likewise, the second split signal $S3_B$ is forwarded to a second receive port 28 of a mixer 30 where the signal $S3_B$ is combined with a second coupled portion of the transmitted signal $S1_{P2}$ forwarded to a second receive port 32 of mixer 30. The mixer 30 combines the signals to form a reference processing signal S5.

In accordance with an important aspect of the present invention, the resultant processing signals S4 and S5 are shifted substantially ninety degrees so as to be different in phase. For example, the microstrips or waveguides on/through which the split signals $S3_A$, $S3_B$ travel may be sufficiently different to cause the necessary difference in phase. Alternatively, an in-line phase shifter may be utilized. In the present preferred embodiment, as shown in FIG. 2, microstrip transmission lines 34, 36 of differing lengths connect the output of a microstrip Wilkinson divider 40 that is driven by a waveguide coupled to microstrip coupler 38 to the second receive ports 26, 32 of mixers 24, 30 for coupling the portions of the transmitted signals $S1_{P1}$, $S1_{P2}$. Preferably the microstrip transmission line for the test processing signal S4 is one quarter wavelength longer than the transmission line for the reference processing signal S5.

As indicated above, the resulting processing signals S4 and S5 are equal in magnitude but sufficiently different in phase to allow the radar system 10, and specifically the speed determining circuitry 44, to determine the direction of a selected target T1 relative to the platform P and to accurately calculate the resulting speed. The phase differential in the processing signals S4 and S5 also assists the radar system 10 to accurately calculate the direction and speed of a selected target in a stationary mode of operation.

Figure 3:
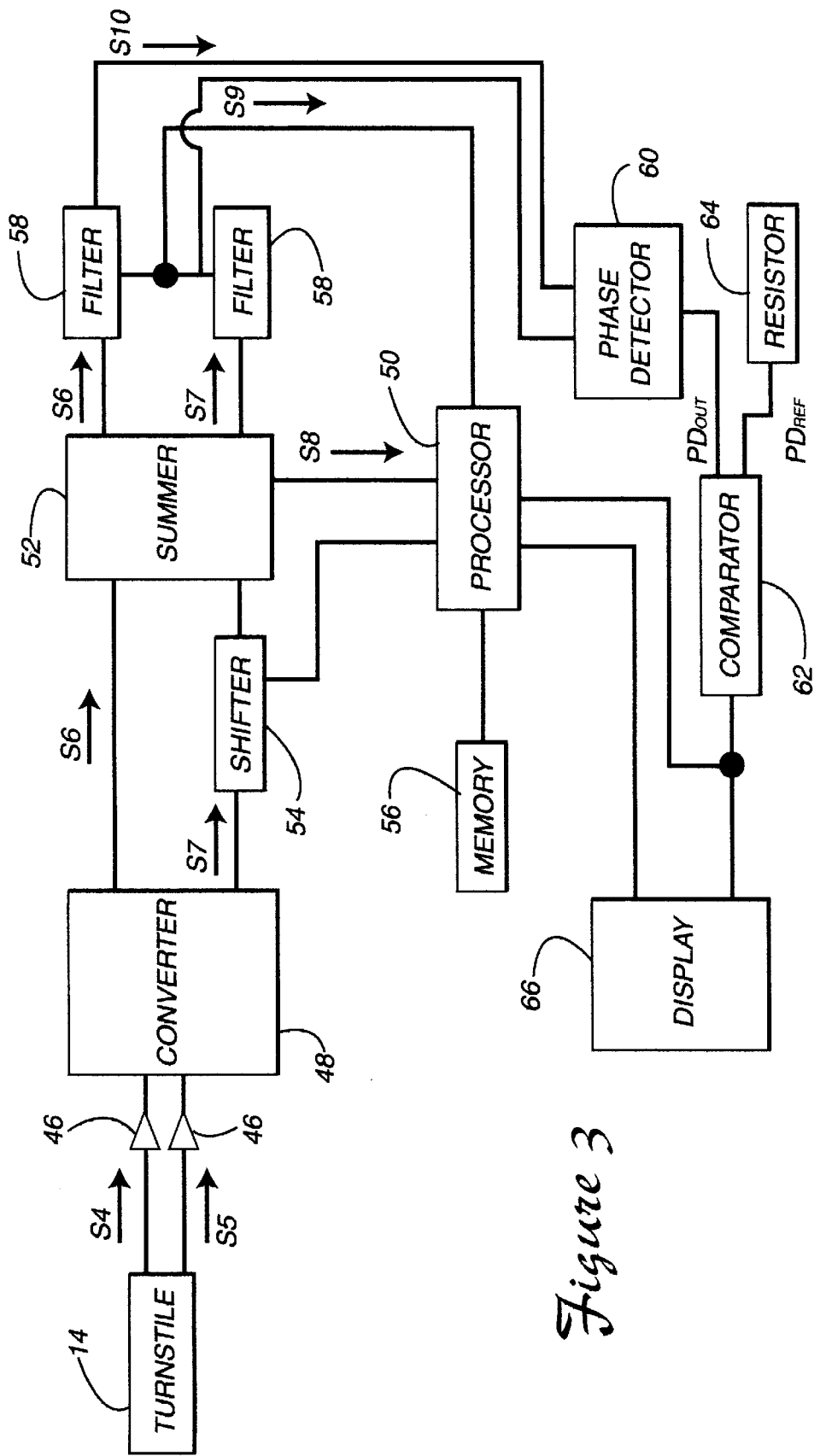
FIG. 3 is a schematic block diagram of one embodiment of the speed determining circuitry of the present invention.

As shown in FIG. 3, the resulting processing signals S4 and S5 are amplified by preamplifiers and converted into digital test and reference processing samples S6, S7 by an analog to digital converter 48. In the preferred embodiment, a stereo analog to digital converter is utilized to provide the processing samples S6, S7.

In the same lane moving mode of operation, the speed determining circuitry 44 of one embodiment of the present invention, and in particular a processor 50, transforms the output of summer 52 or the sum of the processing samples S8, from the time domain to the frequency domain to provide a frequency spectrum. It should be noted that shifter 54 is selectively disabled in the moving mode of operation, but will be discussed below with regard to the stationary mode of operation. More specifically, in this embodiment a digital signal processor is utilized to perform a fast Fourier transform on the sum of the processing samples S8. The resulting frequency spectrum includes a plurality of bins indicative of the Doppler components of the at least one target including the amplitude and frequency of each target $T_1, T_2 \ldots T_n$. During operation, the radar system 10 searches the Doppler components stored in memory 56 and selects a target T according to the present operating mode of the radar system.

In the stationary mode of operation, the speed determining circuitry 44 and in particular, the processor 50 selectively shifts the phase of one of the processing samples prior to summing and transforming the resultant sample S8 from the frequency to the time domain. More specifically, the phase of the processing sample S7 is selectively shifted substantially ninety degrees either forward or backward depending upon the mode of operation of the radar system. To accomplish the phase shift a Hilbert transformer 54 is used to process the sample S7 utilizing the processor 50. By selectively shifting the phase of the processing sample S7 forward or backward, the radar system can selectively eliminate all approaching or receding targets depending upon the present patrol scenario. The elimination of the selected targets occurs when the non-selected sample, S6 in the present embodiment, is summed with the shifted sample S7. The summation of the samples effectively cancels the unwanted target signals.

For example, the operator of a patrol vehicle parked on the shoulder of a divided highway and utilizing a rear facing antenna may desire only to monitor traffic on the same side of the divided highway as the patrol vehicle. In this particular scenario, the radar system is set to selectively filter all receding targets from the speed determining process by shifting the phase of the processing sample S7 substantially ninety degrees, thus reducing unwanted targets and additional noise. The additional shifting step increases the accuracy of the speed measurements, as well as, the overall flexibility and reliability afforded to the system operator.

In the stationary mode of operation, the sum of the processing samples S8 is converted from the time domain to the frequency domain, as described in detail above for the same lane moving mode of operation. Dependent upon the present selected mode of operation of the radar system, that is, the fastest or strongest signal mode, a target T is selected.

In accordance with another important aspect of the method of the present invention and independent of the selected stationary or moving mode of operation, once the selected target T is determined, the speed determining circuitry 44 of the present embodiment selectively filters the processing samples S6 and S7 to allow only a range of frequencies substantially centered about the frequency of the selected moving target T to pass. In this particular embodiment, the filters 58 are band pass filters implemented by software algorithms. In other words, the processor 50 selects an address in memory 56 dependent upon the frequency of the selected target T where the selected band pass filter coefficients are stored. The filter coefficients are a group of twelve numbers, in the preferred embodiment, which are processed by the processor 50, thus determining the filters 58. Selectively filtering the processing samples S6 and S7 in this manner increases the accuracy of the speed measurements, as well as the overall flexibility and reliability of the system.

A phase detector 60 of a type generally known in the art is next utilized to detect the phase difference between the filtered samples S9, S10. In the present embodiment, the phase detector 60 is flip-flop phase detector which operates solely on the zero crossings of the filtered samples S9, S10. The output of the phase detector 60 is in the form of a signal level $PD_{OUT}$. For example, if the sample S9 is leading S10 then the filter output should be above, for example, 0.0 or approximately 0.5. Alternatively, if sample S9 is lagging S10 the output should be below 0.0 for example −0.5. If the phases of samples S9 and S10 are substantially the same due to a weak target return signal or a dominant noise signal, the output will be somewhere in between these levels, and as a precautionary measure the radar system 10 does not provide a direction indication or a calculated speed in these instances.

The resulting signal output of the phase detector $PD_{OUT}$ is compared to a reference signal $PD_{REF}$ utilizing a comparator 62. In the present embodiment, the comparator 62 is a Schmidt trigger implemented in a software subroutine by processor 50 and the reference signal $PD_{REF}$ is of some preset or selectable value. The output of the comparator 62 indicating the leading/lagging relationship of the phases of samples S9, S10 is utilized by the processor 50 to calculate the speed of the selected target vehicle T, which is provided to the system operator via display 66. Additionally, the output of the comparator is utilized to drive a target direction indicator of display 66.

Figure 4:
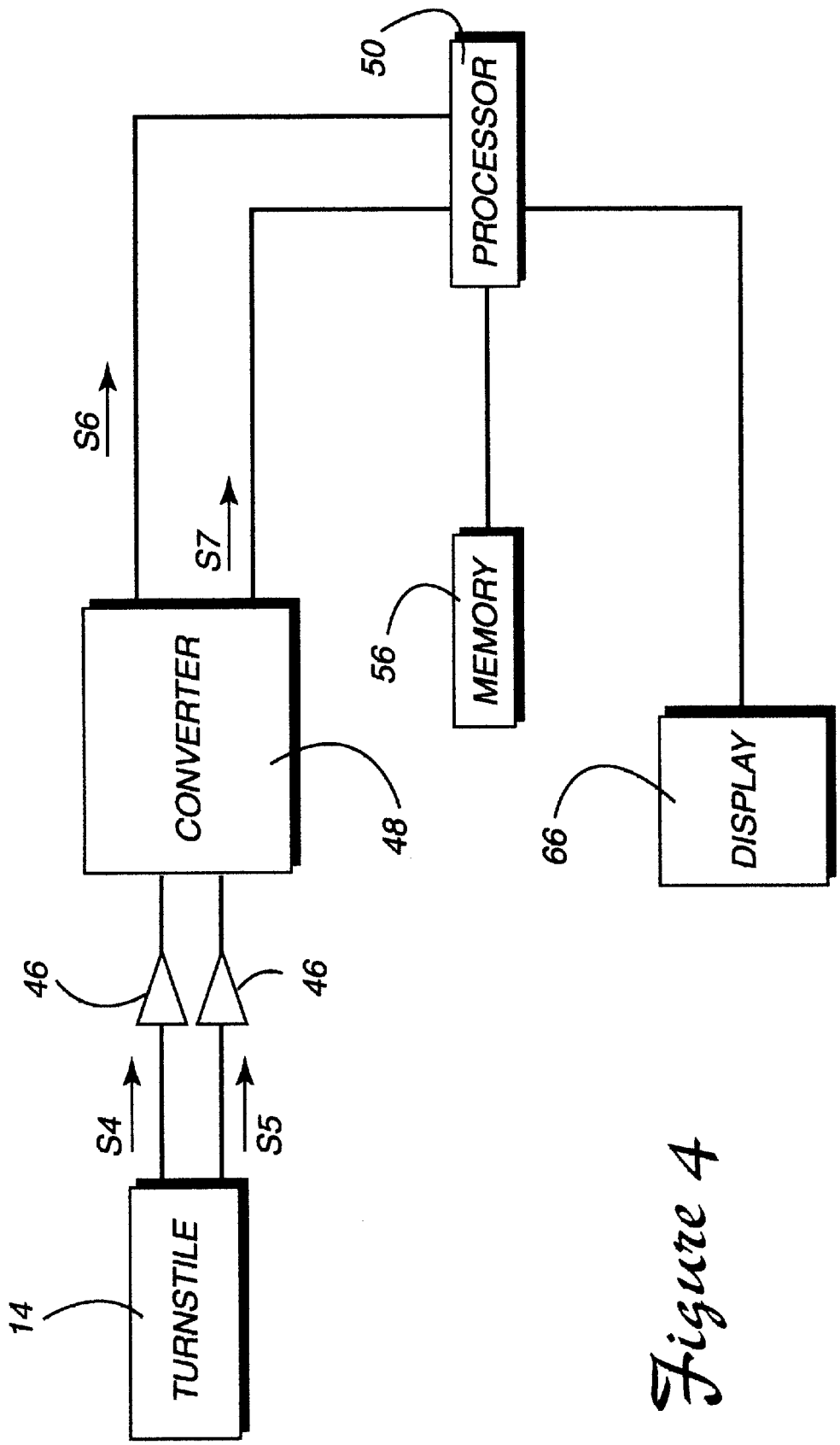
FIG. 4 is a schematic block diagram of an alternate embodiment of the speed determining circuitry of the present invention.
Figure 5:
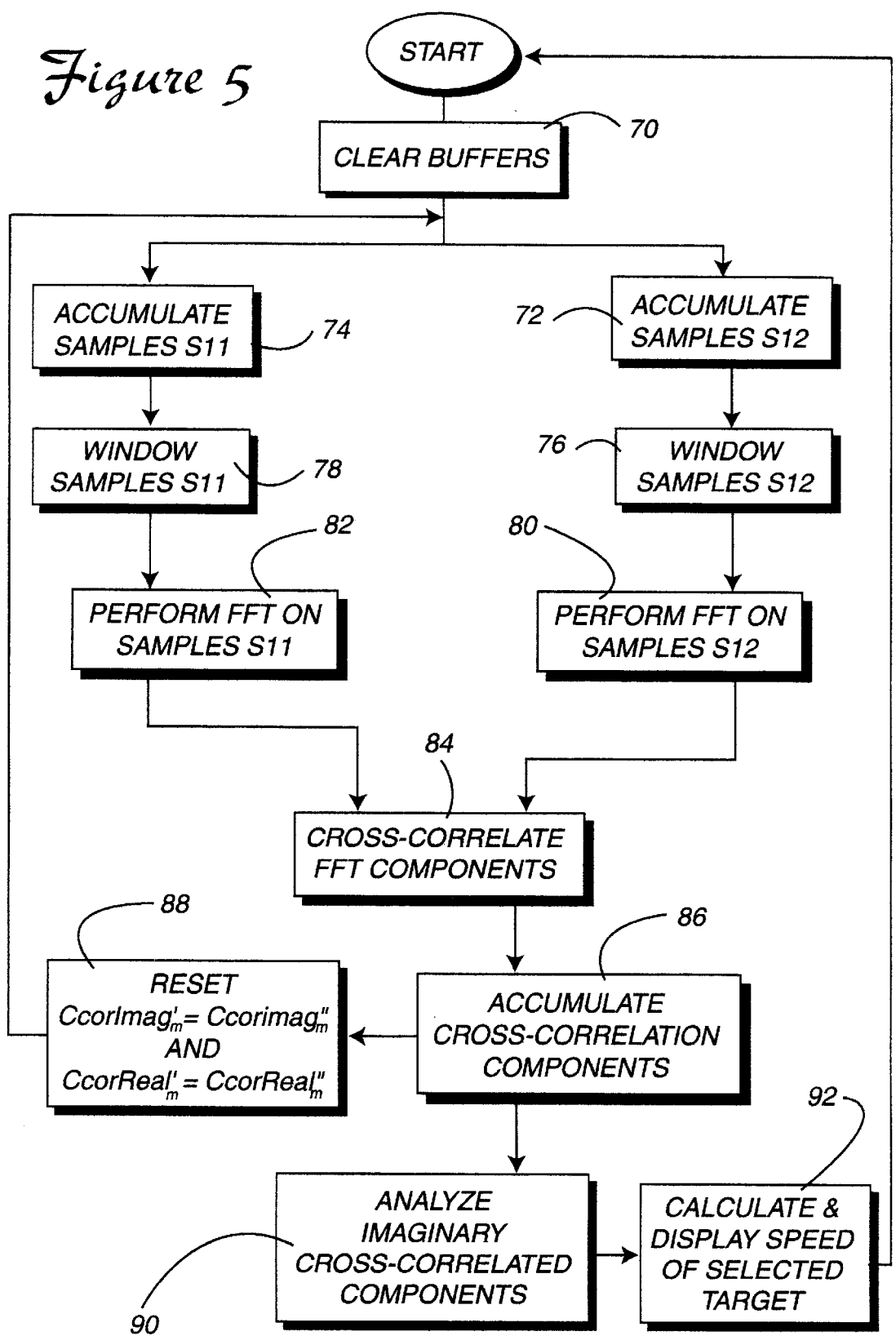
FIG. 5 is a software algorithm flowchart for determining the speed and direction of the at least one target utilizing cross-correlation.

In an alternate embodiment of the present invention shown in schematic block diagram in FIG. 4, the test and reference processing samples S6, S7 are forwarded directly to processor 50 from converter 48 for processing in accordance with the flow chart shown in FIG. 5. Specifically, block 70 represents the processor 50 initially clearing the data buffers in RAM, blocks 72 and 74 represent the accumulation of N-points of the test and reference processing samples S6, S7 to form accumulated test and reference samples S11, S12. In this alternate embodiment, the desired number of data points N in each sample S11, S12 is 1024, however, any number of samples may be utilized.

Blocks 76 and 78 represent the application of a weighted window to the accumulated samples S11, S12. Preferably, the window is a Blackman Harris window designed to provide a weighting coefficient to each of the N accumulated samples S11, S12. Weighting the accumulated samples in this manner minimizes the spectral line leakage between targets thus allowing maximum separation between targets and more accurate data for improved target selection.

In blocks 80 and 82, the weighted accumulated test and reference samples S11, S12 are transformed from the time domain to the frequency domain to provide test and reference frequency spectrums. As indicated above, a digital signal processor may be utilized to perform fast Fourier transforms on each of the accumulated test and reference samples S11, S12. The resulting test and reference frequency spectrums each include a plurality of bins indicative of the Doppler components, i.e., real and imaginary components, of the at least one target including the amplitude and frequency of each target $T_1, T_2 \ldots T_n$. The resulting real and imaginary components for the accumulated sample S11 are mathematically represented as $X_{data}S11_m=\text{Real}[\text{FFT}(S11)]$ and $Y_{data}S11_m=\text{Imaginary}[\text{FFT}(S11)]$, respectively, where $m=0, 1, \ldots (N/2-1)$. Similarly, the resulting components for the accumulated sample S12 are mathematically represented as $X_{data}S12_m=\text{Real}[\text{FFT}(S12)]$ and $Y_{data}S12_m=\text{Imaginary}[\text{FFT}(S12)]$, respectively.

In accordance with an important aspect of this alternate embodiment of the present invention, the resulting real components ($X_{data}S11_m$, $X_{data}S12_m$) and imaginary components ($Y_{data}S11_m$, $Y_{data}S12_m$) for each of the bins in the resulting frequency spectrums are cross-correlated in accordance with the following equations and as represented by block 84:

$$CcorReal_m = (X_{data}S11_m \cdot X_{data}S12_m) + (Y_{data}S11_m \cdot Y_{data}S12_m);$$

and $$CcorImag_m = (Y_{data}S11_m \cdot X_{data}S12_m) - (X_{data}S11_m \cdot Y_{data}S12_m),$$

where m=0, 1, . . . (N/2−1).

Figure 6:
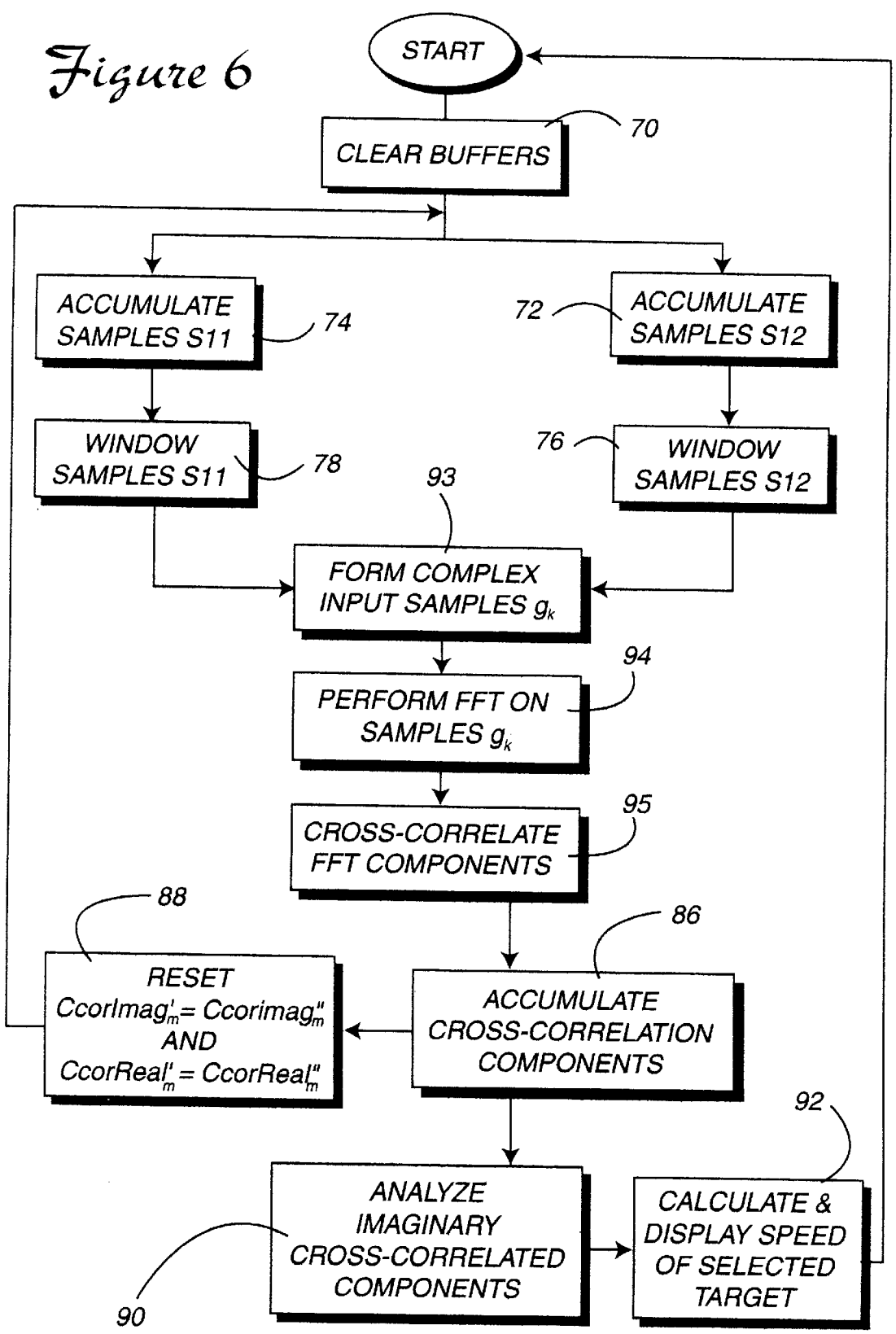
FIG. 6 is an alternate software algorithm flowchart for determining the speed and direction of the at least one target utilizing cross-correlation.

In yet another alternate embodiment of the present invention, the test and reference processing samples S6, S7 are forwarded directly to processor 50 from converter 48 for processing in accordance with the flow chart shown in FIG. 6. Specifically, block 70 represents the processor 50 initially clearing the data buffers in RAM, blocks 72 and 74 represent the accumulation of N-points of the test and reference processing samples S6, S7 to form accumulated test and reference samples S11, S12, and blocks 76 and 78 represent the application of a weighted window to the accumulated samples S11, S12 as described above.

In this alternate embodiment, the digital signal processor 50 is utilized to perform a complex fast Fourier transform utilizing each of the accumulated test and reference samples S11, S12. Specifically, a set of N complex input samples ($g_k = S11^k + jS12_k$) is formed by utilizing input samples $S11_k$ as a real part of $g_k$ and samples $S12_k$ as an imaginary part of $g_k$ in block 93. A complex fast Fourier transform is performed on the input samples $g_k$ in block 94. The resulting frequency spectrum includes a plurality of bins indicative of the Doppler components, i.e., real and imaginary components, of the at least one target including the amplitude and frequency of each target $T_1, T_2 \ldots T_n$. The resulting real and imaginary components are mathematically represented as $$G_k = G_{REAL\ k} + jG_{IMAG\ k},$$

where k=0, 1, . . . (N−1), and $j = \sqrt{-1}$

In accordance with an important aspect of this alternate embodiment of the present invention, the resulting real components ($G_{REAL\ k}$) and imaginary components ($jG_{IMAG\ k}$) for each of the bins in the resulting frequency spectrum are cross-correlated in accordance with the following equations in block 95:

$$CcorReal_m = \tfrac{1}{2}[(GReal_m \cdot GImag_{N-m}) + (GReal_{N-m} \cdot GImag_m)];$$

and $$CcorImag_m = \tfrac{1}{4}[(GImag_m)^2 - (GImag_{N-m})^2 + (GReal_m)^2 - (GReal_{N-m})^2],$$

where m=0, 1, . . . (N/2−1).

Cross-correlating the resulting Doppler components in both alternate embodiments provides real and imaginary cross-correlated components which are indicative of the direction and speed of the at least one target. As represented by block 86 in FIGS. 5 and 6, subsequent cross-correlated components may be accumulated a desired number of times in accordance with the equations shown below in order to improve the signal to noise ratio in both alternate embodiments:

$$CcorReal''_m = CcorReal'_m + CcorReal_m;$$

and $$CcorImag''_m = CcorImag'_m + CcorImag_m,$$

where m=0, 1, . . . (N/2−1) and $CcorReal'_m$ and $CcorImag'_m$ are each initially set to zero in block 70. Following each accumulation step in block 86, $CcorImag'_m$ and $CcorReal'_m$ are set to equal $CcorImag''_m$ and $CcorReal''_m$ respectively in block 88 before the accumulation of additional cross-correlation components.

The resulting imaginary cross-correlated components, i.e., $CcorImag'_m$ are analyzed as represented by block 90 in order to ascertain the direction of the at least one target and stored in memory 56 which may be any suitable internal or external memory device. If the resulting imaginary component is positive, the at least one target is approaching the platform and if the resulting imaginary component is negative, the at least one target is receding from the platform.

As represented by block 92, the radar system next searches the resulting imaginary cross-correlated components and selects at least one target according to the present operating mode of the radar system. Specifically, in the same-lane moving modes of operation, both the positive and negative imaginary cross-correlated components may be searched for either a strongest target, i.e., a target having the largest amplitude, a fastest target, i.e., a target having the highest frequency, or both a strongest target and a fastest target. Alternately, in the opposite lane stationary modes of operation, either the positive or the negative imaginary cross-correlated components are searched for either a strongest target, a fastest target, or both a strongest target and fastest target dependent upon the placement of the patrol vehicle and the antenna within the patrol vehicle.

For example, the operator of a patrol vehicle parked on the shoulder of a highway and utilizing a forward facing antenna may desire only to monitor traffic approaching the patrol vehicle on the opposite side of the highway as the stationary patrol vehicle. In this particular scenario, the radar system is set to ignore all negative imaginary cross-correlated components, or receding targets, from the target selection process, thus reducing unwanted targets traveling in the patrol vehicles own lane. Further, in the same-lane stationary modes of operation, either the positive or negative imaginary cross-correlated components may be searched for either a strongest target, a fastest target, or both a strongest target and fastest target. For example, the operator of a patrol vehicle parked on a shoulder of a divided highway and utilizing a rear facing antenna may desire only to monitor traffic on the same side of the divided highway as the patrol vehicle. In this scenario, the radar system is set to ignore all negative imaginary cross-correlated components, or receding targets, from the target selection process, thus reducing unwanted targets traveling in the opposite lane as the patrol vehicle.

The above examples serve to describe only a few of the several potential scenarios in which a typical Doppler-based radar system is operated. These different scenarios are well known in the art and each potential scenario and which of either or both of the positive and negative imaginary cross-correlated components require searching need not be discussed in detail for the purpose of describing the present invention.

Once the step of selecting the at least one target is accomplished, the speed of the at least one target is calculated dependent upon the determined direction of the at least one target and displayed by the radar system for the operator's use. In accordance with an important aspect of the alternate embodiments of the present invention, the step of selecting a target may occur after the direction of each potential target is determined. Importantly, this allows for the speed of multiple targets to be determined and displayed, if desired.

In summary, the overall flexibility and reliability of the Doppler-based traffic radar system 10 of the present invention is enhanced. This improvement is accomplished primarily by eliminating the need to rely on discretionary decision making by the operator. Specifically, the radar system 10 is adapted to split the return signals $S2_{T_1} \ldots S2_{T_n}$ and to shift the phase of one of the split signals $S3_A$, $S3_B$ within the turnstile 14. The split signals $S3_A$, $S3_B$ are next converted into digital processing samples S6, S7 for further processing by the speed determining circuitry 44. The processing samples may be selectively filtered utilizing filters prior to determination of the phase difference by the phase detector, or transformed into the frequency domain and cross-correlated forming cross-correlation components in the alternate embodiments. Based on these determinations, the speed of the target vehicle traveling in the same lane and in the same direction as the patrol vehicle P is determined without manual intervention from the system operator. The radar system 10 is further adapted in a stationary mode of operation to determine the speed of a selected moving target T independent of the location of the patrol vehicle P.

The foregoing description of a preferred embodiment of the invention has not been presented to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A method for determining the speed of a selected moving target traveling in generally the same direction as a moving platform supporting a Doppler-based radar system and independent of the direction of the target relative to the platform comprising the steps of:

transmitting a signal from the platform toward at least one target;

receiving a return signal reflected from the at least one target, said return signal indicative of the speed of the at least one target including the platform;

forming a test processing signal and a reference processing signal such that said processing signals are different in phase;

determining a direction of the at least one target relative to the platform;

transforming said test and said reference processing signals into the frequency domain to provide a spectrum;

selecting the moving target from said spectrum, the selected moving target being determined by a mode of operation of the radar system;

calculating the speed of the selected moving target dependent upon the direction of the target; and displaying the speed of the selected moving target, whereby the speed of the selected moving target is determined independent of the relative direction of the target to the platform and of operator intervention.

2. The method as claimed in claim 1, wherein the step of forming said processing signals includes the steps of substantially splitting said return signal into first and second split signals; and mixing said first split signal with a first portion of the transmitted signal and said second split signal with a second portion of the transmitted signal, said first and second portions being different in phase.

3. The method as claimed in claim 1, wherein the step of determining the direction of the at least one target relative to the platform includes the steps of cross-correlating said processing signals to obtain real and imaginary cross-correlated components; and analyzing said imaginary cross-correlated components, said imaginary components being positive when the at least one target is approaching the platform and negative when the at least one target is receding from the platform.

4. The method as claimed in claim 3, wherein said spectrum includes bins indicative of the amplitude and frequency of the at least one target.

5. The method as claimed in claim 4, wherein the step of selecting the moving target from said spectrum includes selecting the at least one target having the largest amplitude.

6. The method as claimed in claim 4, wherein the step of selecting the moving target from said spectrum includes selecting the at least one target having the highest frequency.

7. A Doppler-based radar system for determining the speed of a selected moving target traveling in generally the same direction as a moving platform supporting said radar system and independent of the direction of the target relative to the platform comprising:

an oscillator to generate a signal;

an antenna to transmit said oscillator signal toward the at least one target and to receive a return signal reflected from the at least one target, said return signal indicative of the frequency of the at least one target and the platform;

a turnstile in communication with said antenna for receiving said return signal;

a mixer in communication with said turnstile for forming a test processing signal and a reference processing signal such that said signals are different in phase;

circuitry for determining the speed of the selected target, the selected target being determined by a mode of operation of the radar system;

first means of said circuitry for transforming said processing signals into the frequency domain to provide a spectrum; and second means of said circuitry for determining a direction of the at least one target relative to the platform;

whereby the speed of the selected moving target is determined independent of the relative direction of the target to the platform and of operator intervention.

8. The system of claim 7 wherein said second means of said circuitry includes a processor for cross-correlating said processing signals to obtain real and imaginary cross-correlated components and analyzing said imaginary cross-correlated components, said imaginary components being positive when the at least one target is approaching the platform and negative when the at least one target is receding from the platform.

9. The system of claim 8, wherein said processor is further used for calculating the speed of the selected target dependent upon the direction of the selected target relative to the platform and said mode of operation of the radar system.

10. A Doppler-based radar system selectively operable to determine the speed of a moving target traveling in generally the same direction as a platform supporting said radar system and independent of the direction of the target relative to the platform comprising:

an oscillator to generate a signal;

an antenna to transmit said oscillator signal toward at least one target and to receive a return signal reflected from the at least one target, said return signal indicative of the frequency of the at least one target and the platform;

a turnstile in communication with said antenna for receiving said return signal and forming a test processing signal and a reference processing signal such that said signals are different in phase; and circuitry for determining a direction of the at least one target relative to the platform and a speed of the at least one target dependent upon a mode of operation of the radar system.

11. The radar system of claim 10 wherein is further provided a display, said display for showing the speed of at least one selected target of the at least one target.

12. The radar system of claim 10 wherein said circuitry includes a processor for cross-correlating said processing signals to obtain real and imaginary cross-correlated components and for analyzing said imaginary cross-correlated components, said imaginary components being positive when the at least one target is approaching the platform and negative when the at least one target is receding from the platform.

13. The radar system of claim 12 wherein said processor is further used for determining the speed of the selected target dependent upon the direction of the selected target relative to the platform and said mode of operation of the radar system.

14. The radar system of claim 10 wherein said turnstile includes a compensated wave guide tee for substantially splitting said return signal into first and second split signals; and wherein said turnstile includes a mixer for mixing said first split signal with a first portion of the transmitted signal to form said test processing signal and said second split signal with a second portion of the transmitted signal to form said reference processing signal, said processing signals being different in phase.

15. The radar system of claim 10 wherein said circuitry for determining a direction of the at least one target includes a processor for transforming said processing signals into the frequency domain to provide a spectrum and for determining a direction of the at least one target relative to the platform.

16. The radar system of claim 15 wherein said spectrum includes bins indicative of the amplitude and frequency of the at least one target.

17. The radar system of claim 16 wherein said selected moving target is the at least one target having the largest amplitude.

18. The radar system of claim 16 wherein said selected moving target is the at least one target having the highest frequency.

19. A method for determining the speed of at least one moving target traveling in generally the same direction as a platform supporting a Doppler-based radar system and independent of the direction of the at least one target relative to the platform comprising the steps of:

transmitting a signal from the platform toward the at least one target;

receiving a return signal reflected from the at least one target, said return signal indicative of the speed of the at least one target including the platform;

forming a test processing signal and a reference processing signal such that said processing signals are different in phase;

determining a direction of the at least one target relative to the platform;

calculating the speed of the at least one target dependent upon the direction of the at least one target; and displaying the speed of at least one selected target of the at least one target.

20. The method as claimed in claim 19 wherein the step of determining a direction of the at least one target includes the steps of transforming said processing signals into the frequency domain to provide a spectrum; and selecting the at least one selected target from said spectrum, the at least one selected target being determined by a mode of operation of the radar system.

21. The method as claimed in claim 20, wherein the step of determining the direction of the at least one target further includes the steps of cross-correlating said processing signals to obtain real and imaginary cross-correlated components; and analyzing said imaginary cross-correlated components, said imaginary components being positive when the at least one target is approaching the platform and negative when the at least one target is receding from the platform.

* * * * *

UNITED STATES PATENT AND TRADEMARK OFFICE
CERTIFICATE OF CORRECTION

PATENT NO. : 6,462,702 B1
DATED : October 8, 2002
INVENTOR(S) : Harvey F. Bowlds It is certified that error appears in the above-identified patent and that said Letters Patent is hereby corrected as shown below:

Column 8,
Line 60, replace "XdataS11m = Real[FFT(S11)]" with -- XdataS11m = Real[FFT(S11)]m --;
Line 61, replace "YdataS11m = Imaginary[FFT(S11)]" with -- YdataS11m = Imaginary[FFT(S11)]m --;
Line 64, replace "XdataS12m = Real[FFT(S12)]" with -- XdataS12m = Real[FFT(S12)]m --;
Line 65, replace "YdataS12m = Imaginary[FFT(S12)]" with -- YdataS12m = Imaginary[FFT(S12)]m --; and Column 9,
Line 28, replace "(gk=S11k+jS12k)" with -- (gk=S11k+jS12k) --.

Signed and Sealed this

Twenty-ninth Day of July, 2003

JAMES E. ROGAN
*Director of the United States Patent and Trademark Office*